United States Patent [19]

Hawkes

[11] Patent Number: 5,028,061
[45] Date of Patent: Jul. 2, 1991

[54] FRAME

[75] Inventor: Peter C. Hawkes, Rugby, England

[73] Assignee: Hestair Maclaren Limited, Northamptonshire, England

[21] Appl. No.: 342,062

[22] Filed: Apr. 24, 1989

[30] Foreign Application Priority Data

Apr. 25, 1988 [GB] United Kingdom ............... 8809690
Feb. 17, 1989 [GB] United Kingdom ............... 8903668

[51] Int. Cl.$^5$ .............................................. B62B 7/10
[52] U.S. Cl. .................................. 280/47.4; 280/642; 280/650; 297/327; 403/105; 403/314
[58] Field of Search ................. 280/47.25, 47.4, 47.41, 280/642, 644, 650; 297/327, 440; 403/84, 103, 105, 111, 314, 320

[56] References Cited

U.S. PATENT DOCUMENTS

| 3,550,998 | 12/1970 | Boudreau et al. | 280/650 X |
| 3,563,601 | 2/1971 | Dickey | 280/47.25 X |
| 4,545,613 | 10/1985 | Martel et al. | 297/327 X |
| 4,697,845 | 10/1987 | Kammah | 297/327 X |
| 4,836,573 | 6/1989 | Gebhard | 280/47.41 X |

FOREIGN PATENT DOCUMENTS

| 0271422 | 11/1987 | European Pat. Off. | |
| 17358 | 11/1955 | Fed. Rep. of Germany | 297/327 |
| 936817 | 12/1955 | Fed. Rep. of Germany | 297/327 |
| 1289332 | 2/1962 | France | 280/47.4 |
| 7404517 | 2/1974 | France | |
| 7530904 | 10/1975 | France | |
| 8113144 | 3/1981 | France | |
| 606695 | 8/1948 | United Kingdom | 297/440 |
| 2163478A | 2/1986 | United Kingdom | |

Primary Examiner—Andres Kashnikow
Assistant Examiner—Michael Mar
Attorney, Agent, or Firm—Lowe, Price, LeBlanc, Becker & Shur

[57] ABSTRACT

A frame, suitable for a child's buggy, is provided for removably supporting a seat for a child in a plurality of angular positions, comprising a manually operable lateral mechanism which is adapted to support the seat whereby the seat is fixedly mountable in and releasable from the frame, the mechanism also providing adjustment of the seat to a desired fixed angular position in relation to the frame. The manually operable mechanism comprises a rotatable knob which allows a wedge or dove-tailed part thereof to be withdrawn from engagement with another part so that it can be rotated to a different angular position before being drawn back into engagement, when it is locked in position. To release the seat entirely, the knob is a rotated to a further position to withdraw a cooperating locking device so that the seat can be lifted from the dove-tailed part.

11 Claims, 9 Drawing Sheets

FRAME

FIELD OF THE INVENTION

This invention relates to a frame, particularly a frame of a push-chair for a child, often known as a buggy or baby buggy.

BACKGROUND OF THE PRIOR ART

Baby buggy frames are usually foldable for storage and/or ease of transport. They often also fold in a "fore and aft" direction, i.e., by bringing the front and rear wheels closely together in the folded position, whereby a carrying tray or receptacle which in use is below the seat, can be retained in the buggy in both the erected and folded condition. It is sometimes desirable to have the seat in which the child sits, facing the pusher of the buggy and sometimes to face away from him (or her). It is also sometimes desirable to replace the seat with another kind, such as a cot if an infant is to be transported.

SUMMARY OF THE DISCLOSURE

It is therefore an object of the invention to seek to provide a frame which will achieve these ends.

According to one aspect of the invention there is provided a frame for removably supporting a seat in a plurality of angular positions, comprising a manually-operable mechanism which is adapted to support the seat whereby that seat is securely mountable in and releasable from the frame, the mechanism also providing adjustment of the member to a desired fixed angular position in relation to the frame.

The frame may be a wheeled frame.

The child support system as a whole may comprise a seat means such as a child's seat or cot or pram.

The mechanism may comprise a mounting lug which is rotatable and which may incorporate retractable means for locking the member in the frame.

The retractable means may comprise a pin which is adapted in one position to engage the seat means to lock it in the frame and in another is retractable from the seat means to allow removal from the frame.

There may be two pins which pass through the mounting lug which may be adapted to receive the seat means and to adjust the angular position thereof.

The mounting lug may have a mounting device complementary to a mounting device of the seat means.

The complementary mounting devices may comprise a substantially dove-tail shape projection on the lug and a substantially dove-tail shape blind slot on the seat means.

The lug may also have locking means adapted to lock with similar locking means of the frame. The complementary locking means may comprise teeth which are interengageable to provide angular adjustment.

The lug may be mounted under pressure of biassing means adapted to bias the teeth apart.

The mechanism may comprise a lever which is movable between discrete positions whereby to allow locking of the seat means in the frame, angular adjustment thereof in the frame, and removal thereof from the frame.

Alternatively, the mechanism may comprise a member rotatable to a plurality of discrete positions whereby to allow locking of the seat means in the frame, angular adjustment thereof in the frame, and the removal thereof from the frame.

The rotatable member may be releasable for rotation by a press stud.

According to a second aspect of the invention, there is provided a universal child support system comprising a frame as hereinbefore defined, a plurality of interchangeable seat means for mounting in and removal from the frame, and a support for a seat means when not in the frame.

The support may be a bouncer frame.

The seat means may include a child's car seat which is adapted for mounting in and removal from a car (or other vehicle) and for mounting in the frame and/or the bouncer frame as desired.

A frame embodying the invention is hereinafter described, by way of example, with reference to the accompanying drawings.

DESCRIPTION OF THE PREFERRED EMBODIMENTS

Figure 1:
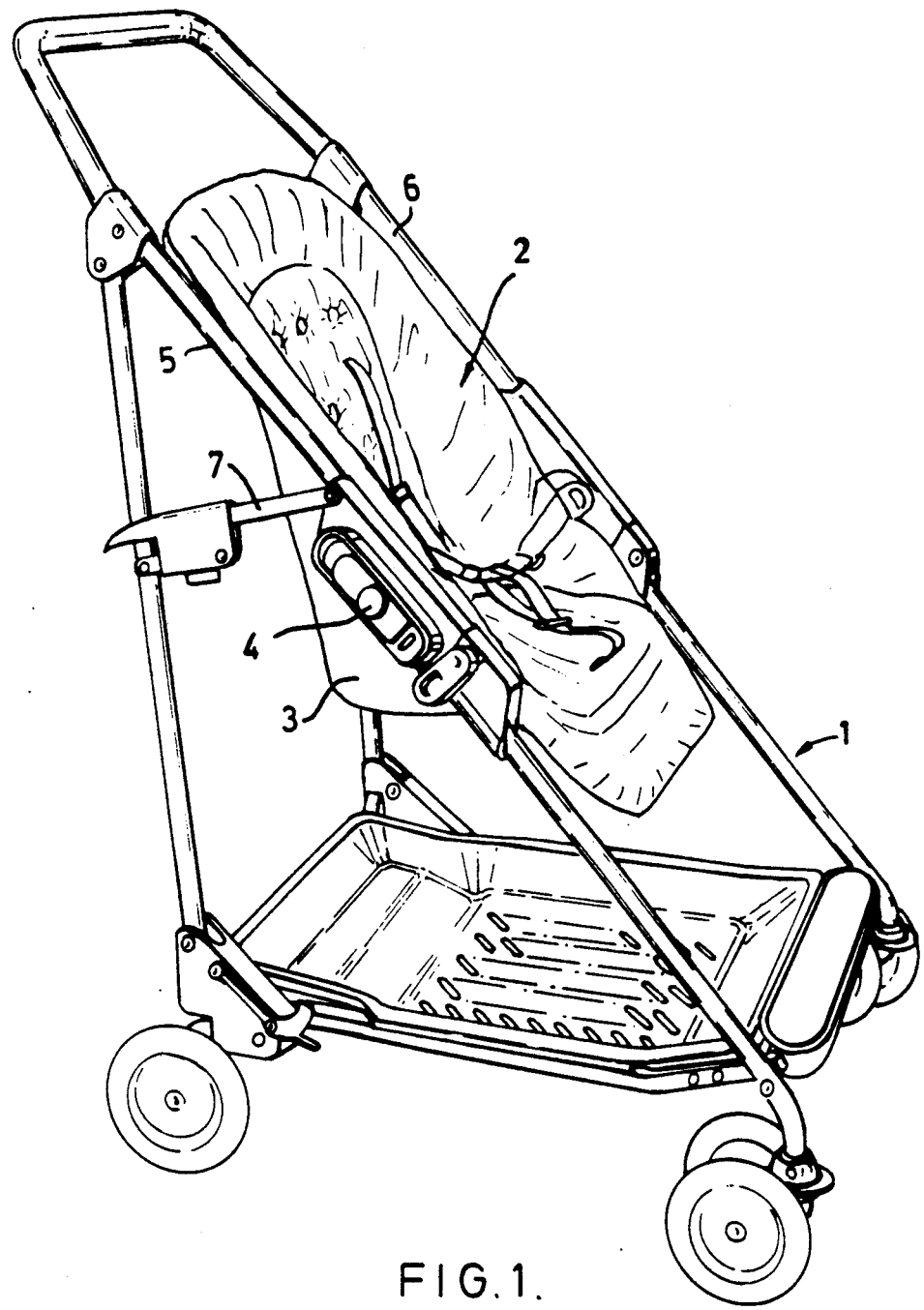
FIG. 1 is a perspective view of the frame according to the invention, in the form of a wheeled buggy, with a seat means in one position.
Figure 2:
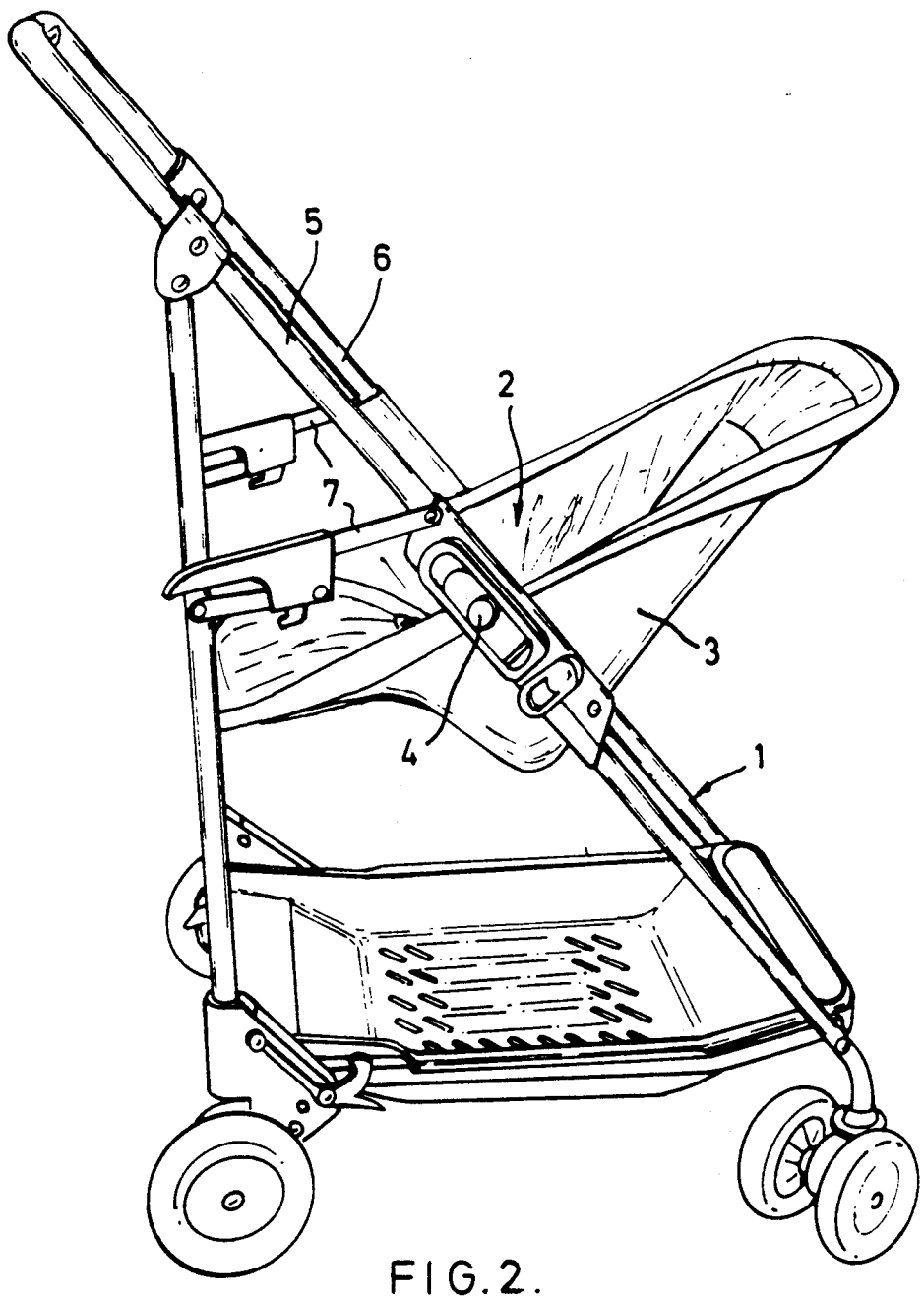
FIG. 2 is a perspective view of the buggy of FIG. 1 with the seat means in a different angular position.
Figure 3:
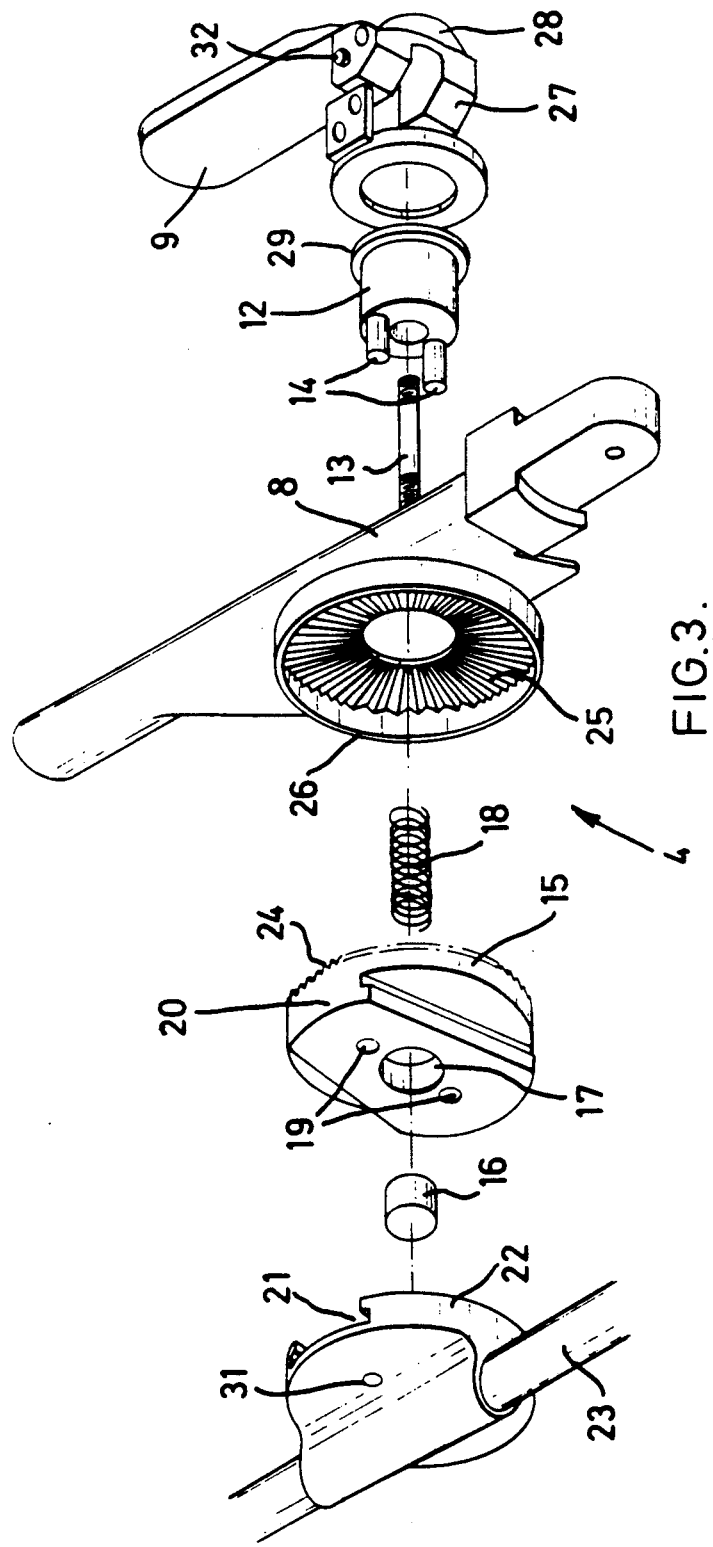
FIG. 3 is an enlarged exploded view of a manually operable mechanism of the frame of FIGS. 1 and 2 whereby the seat means is mountable in, removable from, and adjusted angularly with respect to, the frame.
Figure 4:
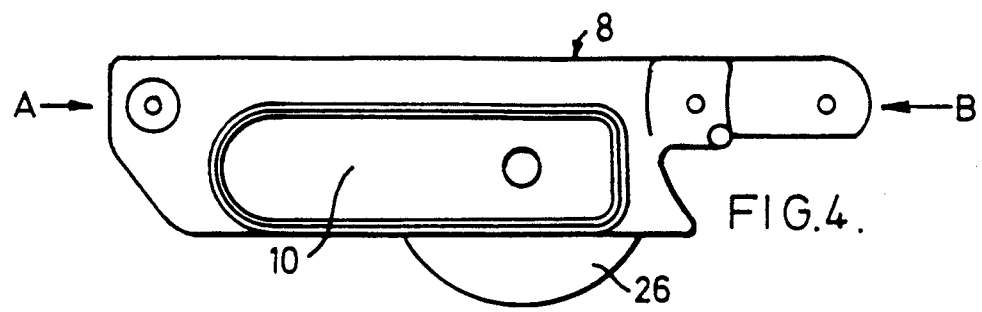
FIG. 4 is a side elevational view of part of the mechanism of FIG. 3, from outside the frame.
Figure 5:
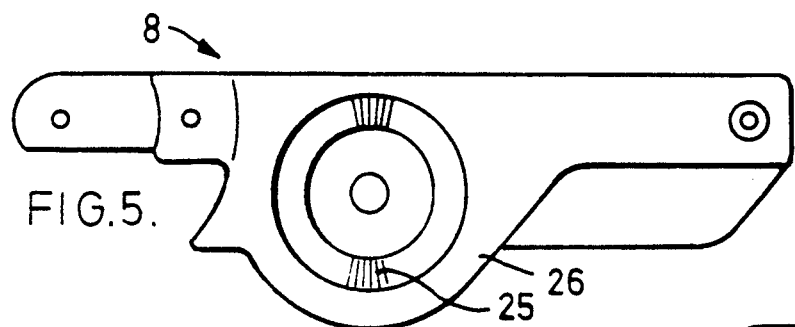
FIG. 5 is a side elevational view of the part of FIG. 4, from inside the frame.
Figure 6:
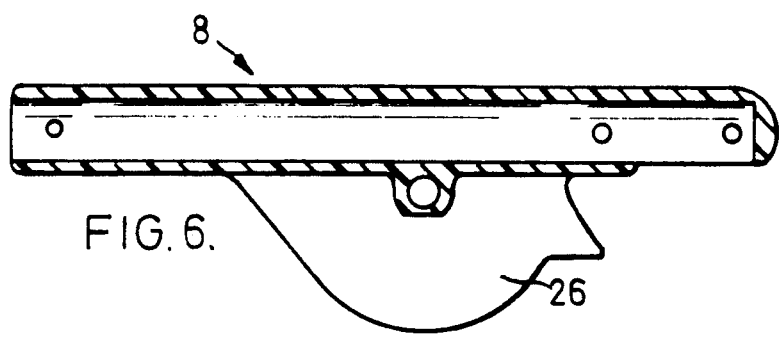
FIG. 6 is a longitudinal sectional view of the part of the mechanism of FIGS. 4 and 5.
Figure 7:
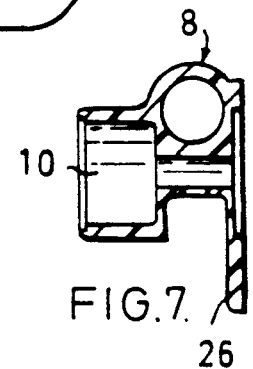
FIG. 7 is a transverse sectional view of the part of the mechanism of FIGS. 4 and 5.
Figure 8:
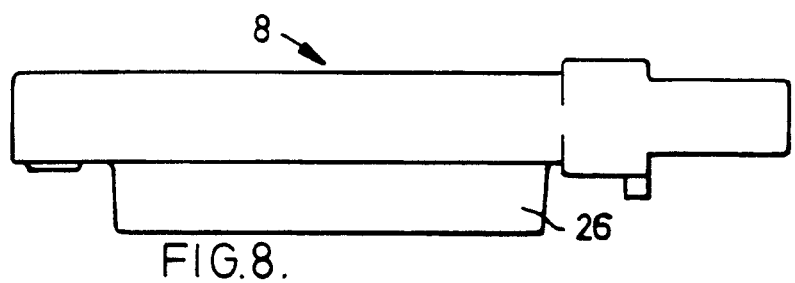
FIGS. 8 and 9 are respectively top and bottom plan views of the part of the mechanism of FIGS. 4 and 5.
Figure 10:
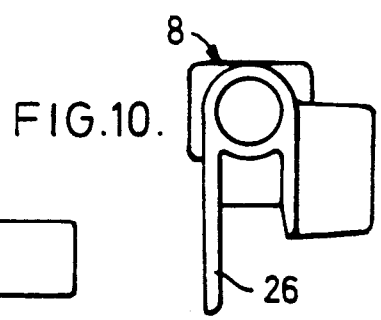
FIGS. 10 and 11 are respective end elevational views of the part of the mechanism of FIGS. 4 and 5, taken in the direction of arrows "A" and "B" respectively.
Figure 9:
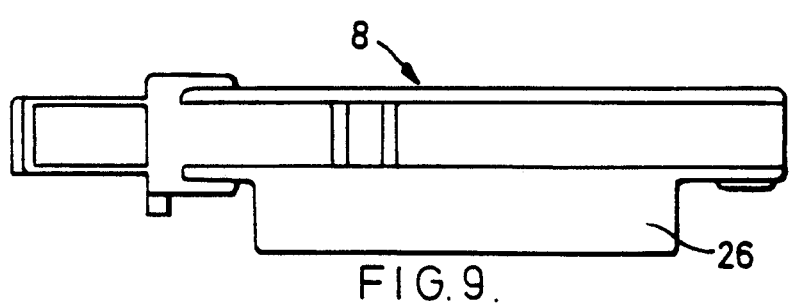
Figure 11:
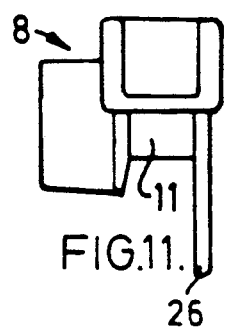

Referring to the drawings, in which like parts are identified by like reference numerals, and which show a right hand part of the frame (the opposite hand always corresponds so only one is shown for clarity) there is shown in FIGS. 1 and 2 a frame 1 (in the case of a buggy 2) for removably supporting child support means such as a seat means 3 for a child in a plurality of angular positions, comprising a manually operable lateral mechanism 4 which is adapted to support the seat means 3 whereby that seat means 3 is fixedly mountable in and releasable from the frame 1, the mechanism 4 also providing adjustment of the seat means 3 to a desired fixed angular position in relation to the frame 1.

The frame 1 comprises two spaced side frame parts 5 and 6 of metal mounted on wheels, and being foldable fore and aft by the front or leading elongate members, comprising metal, usually metal tube being "breakable" at an elbow pivot, the fore and aft parts of each side frame part being connected by a "breakable" strut 7 to allow collapsing of the frame 1 when broken and when a secondary catch at the elbow pivot is also released.

To achieve this, the fore tube member of each side frame part comprises two elongate members which in the erect position shown in FIGS. 1 and 2 are more or less aligned, the lower (in use when erected) elongate member being secured in a housing 8 which provides part of the mechanism 4, FIGS. 3-11.

The housing 8 is a plastic molding which comprises the mechanism 4 which has a manually operable lever 9 receivable in a recess 10 in the housing 8 on the outside of the frame (as considered in use). The housing 8 includes a bore 11 in which the slidable plastic plug 12 is reciprocable, being mounted on a rod 13 connected to the lever 9 and having two projecting pins 14 spaced apart on a diameter, the rod 13 passing therebetween. The mechanism 4 also includes a rotatable device or lug 15 secured to the rod 13 by a nut 16 in a recess 17 urged away from the housing 8 by biassing means in the form of a coil spring 18 mounted on the rod 13 and acting between an outer (in use) face of the device 15 and an inner face of the housing. The device 15 has two through bores 19 aligned with the pins 14 and carries on one face a mounting means in the form of a substantially dove-tail shaped projection 20 which is complementary in shape to a blind dove-tail shaped recess 21 in a mounting block 22 on a side frame 23 of the seat means 3.

The opposite face or side of the device 15 to the projection 20 has a circumferential array of teeth 24 which face and are adapted to engage with a fixed circular array of teeth 25 on a part 26 of the housing 8 on the inside of the frame 1 in use. The lever 9 has a cam face 27, in this case a flat, for engaging the plug 12 at a face 29 and a push button 28 which operates a latch in the recess 10 so that the lever 9 can be pivoted therefrom. There is a further latch or stop 30 which engages the lever 9 in an intermediate position and which has to be released to release the lever 9 for pivoting to a position in which it projects at substantially 90° from the housing recess 10, for removal of the seat means 3.

In use the frame 1 is used to support the seat means 3, the complementary dove-tail projection 20 at each side of frame 1 being received in the adjacent dove-tail blind slot 21 of the seat means 3 (it will be understood that there is an identical mechanism 4 at each side of the frame 1).

The lever 9 is pivoted to a position in which it is latched by the first latch in the recess 10 (FIG. 3), so that the pins 14 project inwardly beyond the inner face of the projection 20 and engage in aligned holes 31 in the mounting block 22 of the seat means 3, the holes 31 being in a face of the dove-tail slot 21. The pins 14 thus lock or retain the seat means 3 in the frame 1. The seat means 3 is in the FIG. 1 position, facing foreward, that is away from the pusher, and the teeth 24, 25 are meshed. The seat means 3 is thus firmly retained in the frame 1 and in the desired angular position shown, FIG. 1. If it is desired to adjust the angular position to say the FIG. 2 position, where the seat means 3 faces the pusher, the push button 28 is pushed and the lever 9, now released from the first latch, is pivoted out of the recess 10 under finger pressure applied to the free end, opposite its pivot 32 and the rod 13. This action causes the cam 27 to act on the adjacent face 29 of the plug 12 and to push the device 15 away from the housing 8, compressing the spring 18 so that the intermeshing teeth 24, 25 disengage. The pins 14 are still projecting and hence the seat means 3 is still retained in the frame 1. The seat means 3 can then be rotated to the desired angular position, the lever 9 is returned to the first position, so drawing the rod 13 and hence the device 15 back towards the housing 8 so that the teeth 24, 25 intermesh once more. The seat means 3 is then locked in the new position (FIG. 2). The lever 9 is latched by the first latch, flush in the housing 8.

If it is desired to remove the seat means from the frame and replace it by say a cot (not shown) which has an identical mounting block 22, the push button 28 is again pushed to release the lever 9 which is pivoted to the first position which is at about 60° to the housing 8. The second latch 30 is then operated to release the lever 9 for further movement to 90° which action disengages the cam 27 from the plug 12 and effectively pushes the rod 13 inwardly so that the device 15 slides over the pins 14 and they no longer project from the device 15 and consequently are withdrawn from the holes 31 in the mounting block. The seat means 3 can then be removed from the frame 1 by lifting off dove-tail projection 20.

Figure 12:
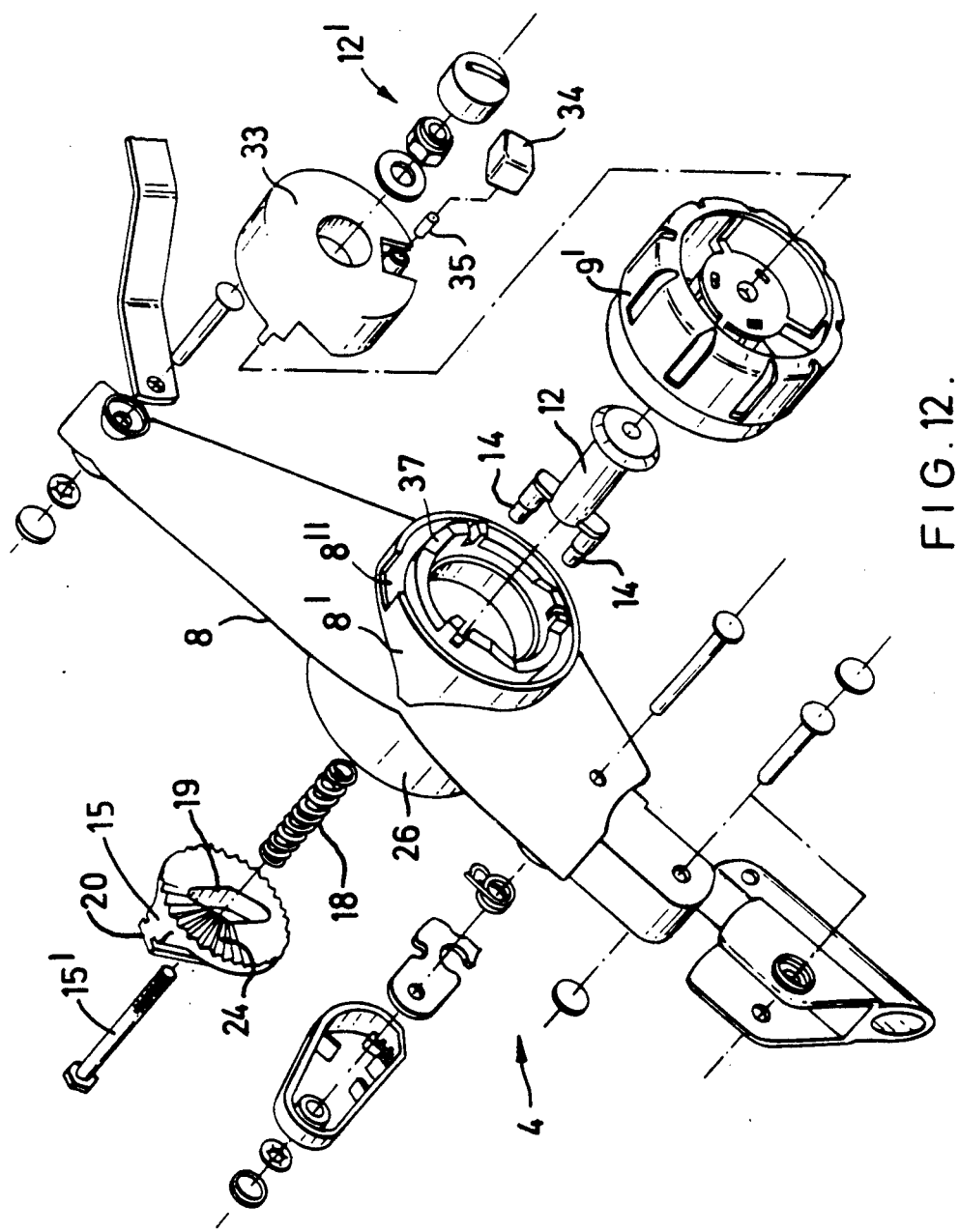
FIG. 12 is an enlarged exploded perspective view of a second embodiment of manually operable mechanism according to the invention, comprising a rotatable member.
Figure 13:
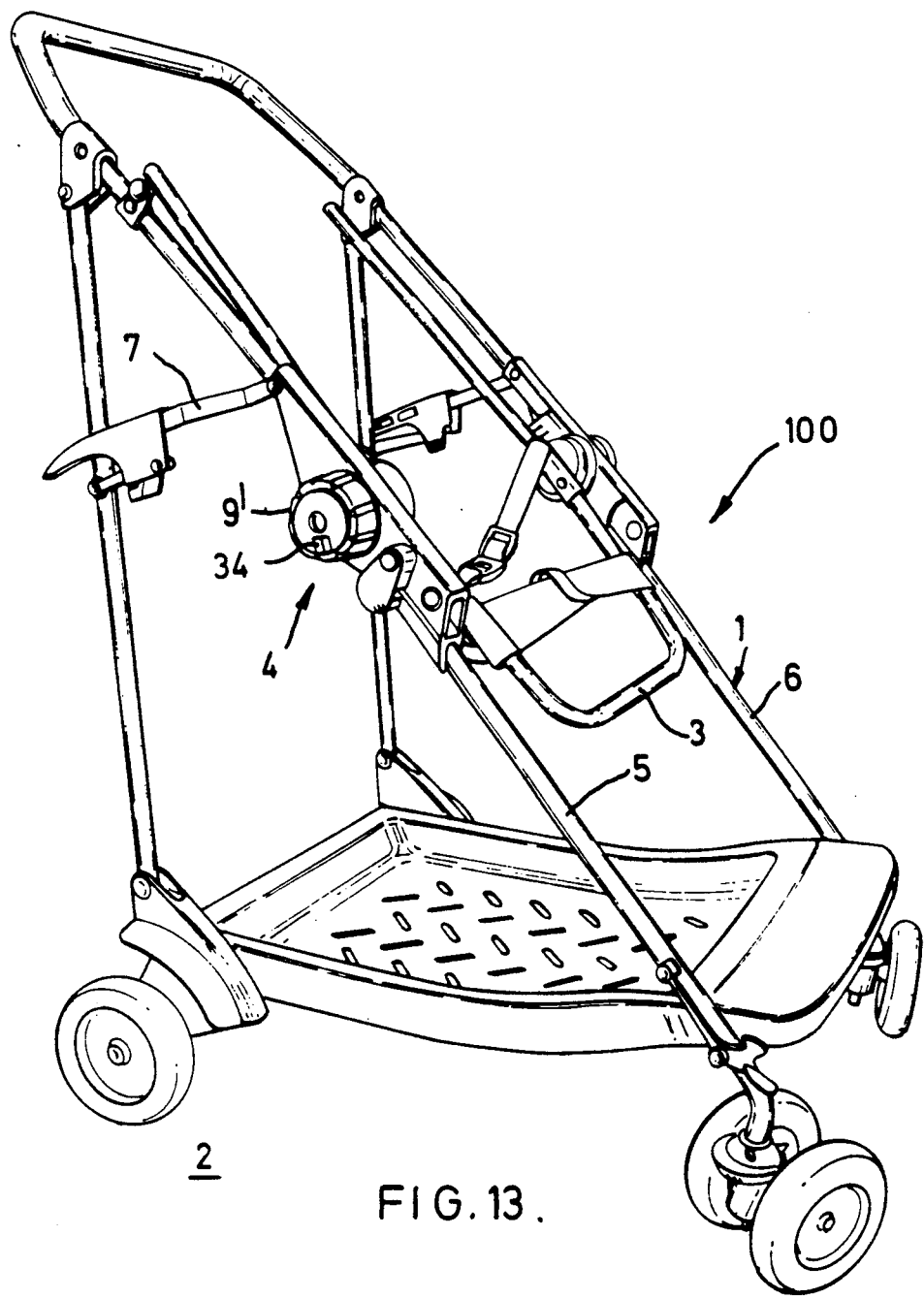
FIG. 13 is a perspective view of the frame according to the invention, in the form of a wheeled buggy, with a seat means in one position using the mechanism of FIG. 12.
Figure 14:
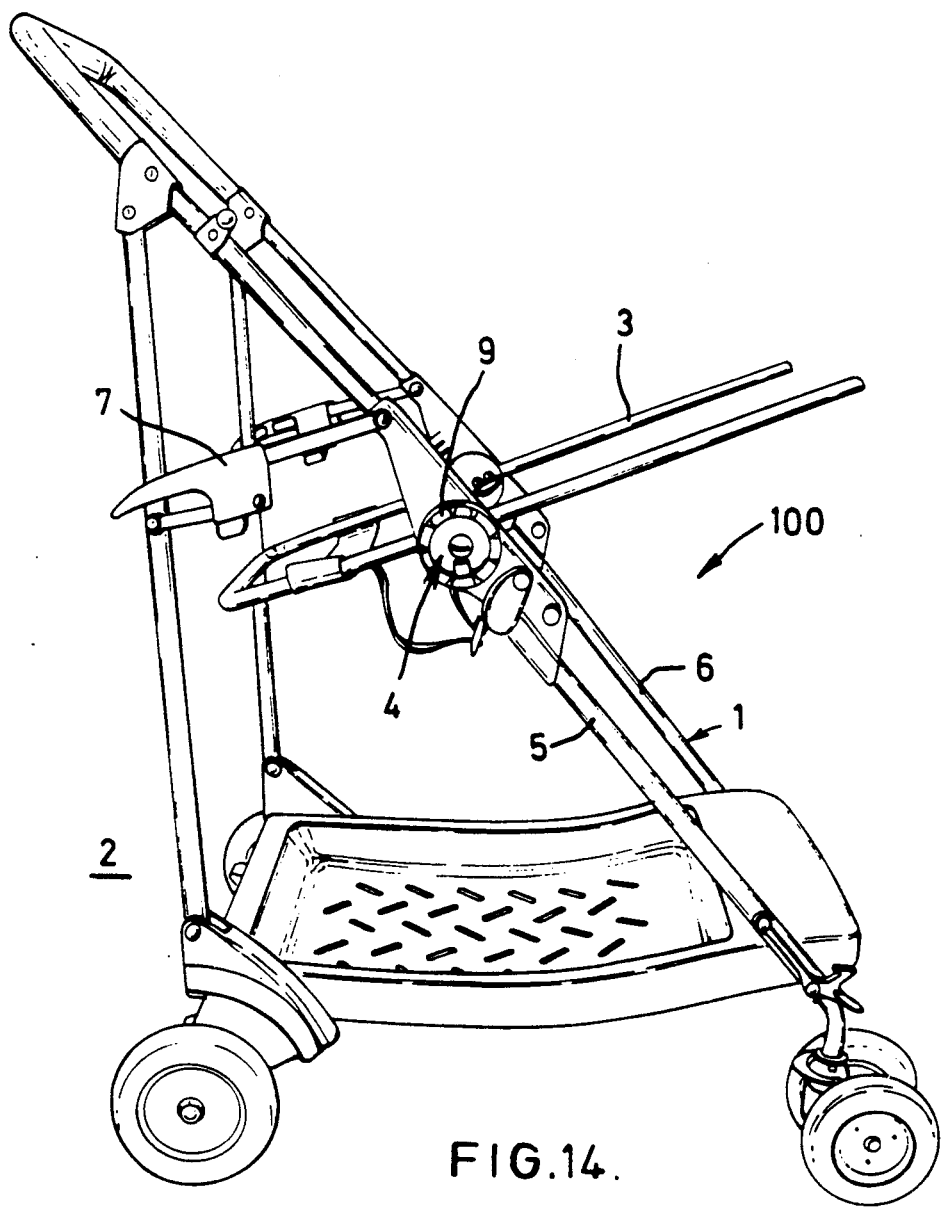
FIG. 14 is a perspective view of the buggy of FIG. 13. with the seat means in a different angular position.
Figure 15:
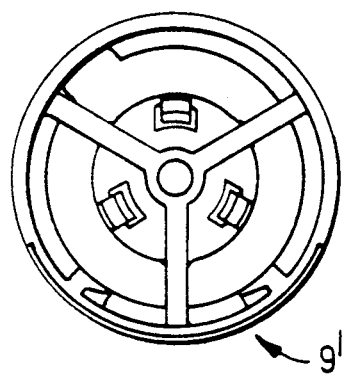
FIGS. 15–15c are respectively enlarged inside elevational, transverse sectional, outside elevational and plan view of part of the second embodiment of manually operably mechanism of FIG. 12.
Figure 15A:
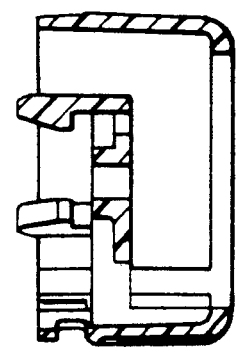
Figure 15B:
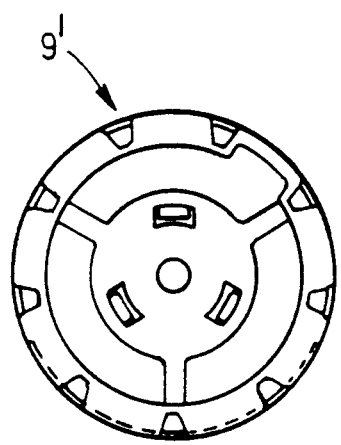
Figure 15C:
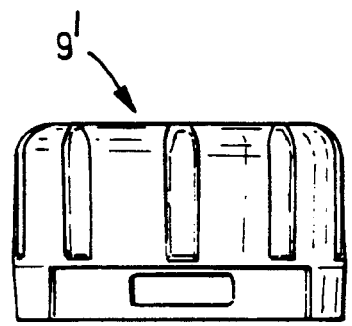
Figure 16A:
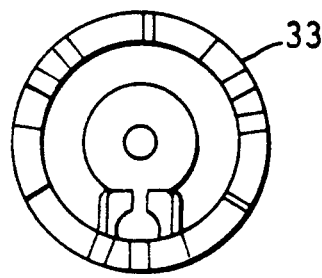
FIGS. 16–16C are respectively enlarged inside elevational, transverse sectional and outside elevational view of part of the mechanism of FIGS. 13–13c.
Figure 16B:
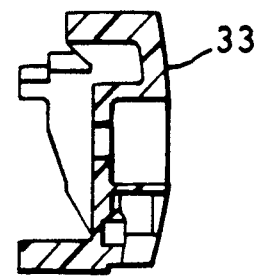
Figure 16C:
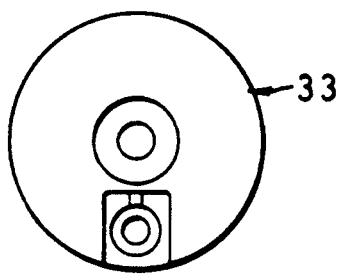
Figure 17A:
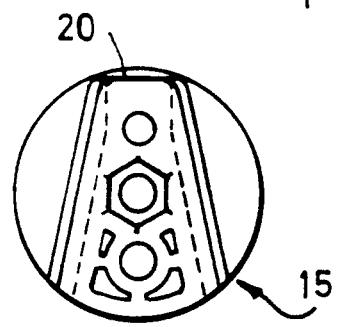
FIGS. 17A to 17D are respectively enlarged inside elevational, side elevational transverse sectional (on line B—B of FIG. 14D) and outside elevational views of a wedge and ratchet device according to the invention.
Figure 17B:
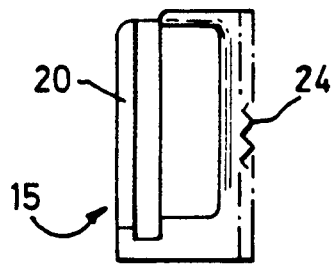
Figure 17C:
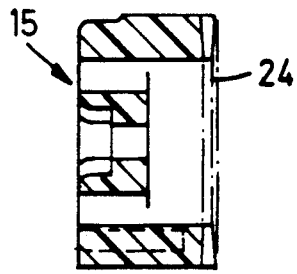
Figure 17D:
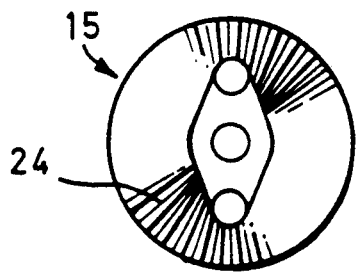

Referring now to FIGS. 12-15D, there is shown in FIGS. 13 and 14 a second embodiment of buggy 100 which has an alternative operating mechanism which replaces the lever mechanism 9 of the buggy shown in FIGS. 1 and 2, which buggy in all other respects is the same as described for the first embodiment described with reference to FIGS. 1 and 2. As before, in the second embodiment, the frame 1 comprises two spaced side frame parts of metal mounted on wheels, and being foldable fore and aft by the front or leading elongate members, comprising metal, usually metal tube, being "breakable" at an elbow pivot, the fore and aft part of each side frame part being connected by a "breakable" strut to allow collapsing of the frame when broken and when a secondary catch at the elbow pivot is also released.

To achieve this, the fore tube member of each side frame part comprises two elongate members which in the erect position shown in FIGS. 13 and 14 are more or less aligned, the lower (in use when erected) elongate member being secured to a housing 8 which provides part of the manually operable mechanism 4 (FIG. 12).

The mechanism 4 comprises a dove-tail spigot (not shown) on a side frame member of a removable seat, (also not shown) which is receivable in and demountable from a dove-tail shaped wedge and ratchet plate 15 of the mechanism. The mechanism 4 also comprises a hand rotatable member or knob 9' which sits in a part 8' which has a notch or detent 8" for receiving a member 33 internally of the knob 9' and which has a finger stud 34 which is depressible against spring 35 to run below the member 8' which also has a fixed cam track 37. The knob 9' also carries the plate 12 carrying the two spigots 14 for engaging in holes for retaining the seat and frame together.

The housing 8 is a plastic moulding which includes a bore 11 in which the slidable plastic plug 12 is reciprocable, the plug carrying the two projecting pins 14 spaced apart on a diameter and being securable to the member 33 and hence the knob 9' via a nut 12' and a bolt 15' by which the ratchet plate 15 which is rotatable with the knob 9', is secured thereto under pressure of biassing means in the form of a coil spring 18 mounted on the bolt 15' and acting between an outer (in use) face of the device 15 and an inner (in use) face of the housing 8. The device 15 has a through bore 19 alignable with the pins 14 so that they can pass therethrough to engage in holes in a mounting block of the seat to secure the seat in the frame in one position. There is a dove-tail shaped projection 20 which is complementary to a blind dove-tail shape recess in the mounting block on a side frame of the seat means, as in FIGS. 1 and 2.

The device 15 has a circumferential array of teeth 20 which face and are adapted to engage with a fixed circular array of teeth or part 26 of the housing 8 on the inside of the frame (in use).

In the position shown in FIG. 13, the seat faces forwards that is in the direction of travel, the dove-tail spigot and slots being in engagement and ratchet teeth being intermeshed to lock the seat in the required angular position. To adjust the "tilt" of the seat it is merely necessary to press the stud 34 to release the knobs 9' so that it is rotatable manually so that it rides over cam track 37 to a lower part thereof so that it moves to the left as viewed to release the ratchet teeth 24, 26 under pressure of spring 18 so that the frame can be rotated to a new desired angular position, the knob 9' then being returned manually to the original position to lock the seat in the new desired angular position when it rides up the cam track and draws the device 15 outwards against spring 18, when the stud 34 "pops into the slots".

In order to prevent accidental operation, the stud 34 in the member 33 has to be depressed in the recess 8" so as to be aligned therewith before the knob 9' can be turned, the edge of the stud 34 engaging with an edge of the slot 8" through which the stud protrudes in the normal, locking, position. The pressing and turning operation can be carried out with one thumb pressing action followed by a turning action.

The seat is released from the frame by depression of the stud 34 as before and turning the member 9' fully to a final angular position to withdraw the spigots 14 from the hole fully as in the first embodiment, so that the seat can be lifted from the wedge 15. The seat can be replaced by a pram-type child carrying device, and placed say in a baby-bouncer type support having a wedge or in a car having a support with a wedge.

In either embodiment, the seat means 3 or child support means such as a cot or car seat may be mounted in a vehicle or placed on a support such as a wire support which has mounting bloks with dove-tail shape projections. The wire support may be resilient, providing a baby bouncer.

A cot or pram body with mounting blocks like the ones of the seat means may then be placed and secured in the frame.

The invention therefore provides a universal baby or child support system which is flexible yet efficient.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A frame for removably supporting a seat means in a plurality of angular positions, comprising:
    a manually-operable mechanism adapted to support and mount the seat means to said frame,
    the mechanism also providing adjustment of said seat means to a desired fixed angular position in relation to said frame,
    wherein the mechanism comprises a housing attached to said frame and a rotatable member which includes a mounting lug, said mounting lug being rotatable about an axis of rotation to a plurality of discrete positions, relative to the housing, to allow locking of the seat means in the frame and angular adjustment thereof relative to the frame and removal thereof from the frame, said mounting lug and said housing having complementary inter-engageable locking means, the rotatable member further comprising a knob seated in the housing of the mechanism, which housing has an annular cam track over which the knob moves upon rotation of said knob following depression of a press stud, said annular cam track extending coaxially about said axis of rotation and having axially extending protrusions which form said cam track, the rotatable mounting lug also being releasable for rotation relative to the housing following depression of the press stud, the press stud being provided on a member located interiorly of the knob and normally projecting through a slot or detent to prevent undesired rotation of said knob, said member having an annular surface with axially extending portions for engaging said protrusions, said axially extending portions being axially movable away from said protrusions following depression of said press stud.

2. A frame as defined in claim 1, wherein:
    said mounting lug incorporates retractable means for locking the member in the frame.

3. A frame as defined in claim 2, wherein:
    the retractable means comprises two pins which pass through the mounting lug which is adapted to receive the seat means and adjust the angular position thereof.

4. A frame as define in claim 2, wherein:
    the mounting lug has a lug mounting device complementary to a mounting device of the seat means.

5. A frame as defined in claim 4, wherein:
    the lug mounting device comprises a substantially dove-tail shape projection on the lug and a substantially dove-tail shape blind slot on the seat means.

6. A frame as defined in claim 4, wherein: the lug has locking means adapted to lock with similar locking means of the frame.

7. A frame as defined in claim 4, wherein:
    said complementary inter-engageable locking means comprises teeth which provide said angular adjustment between the seat means and the housing.

8. A frame as defined in claim 1, wherein: the retractable means comprises a pin which is adapted in one position to engage the seat means to lock it in the frame and in another is retractable from the seat means to allow removal from the frame.

9. A universal child support system, comprising:

a frame including a manually-operable mechanism adapted to support and mount the seat means to said frame, the mechanism also providing adjustment of said seat means to a desired fixed angular position in relation to said frame, wherein the mechanism comprises a housing attached to said frame and a rotatable member which includes a mounting lug, said mounting lug being rotatable about an axis of rotation to a plurality of discrete positions relative to the housing, to allow locking of the seat means in the frame and angular adjustment thereof relative to the frame an removal thereof from the frame, said mounting lug and said housing having complementary inter-engageable locking means, the rotatable member further comprising a knob seated in the housing of the mechanism, which housing has an annular cam track over which the knob moves upon rotation of said knob following depression of a press stud, said annular cam track extending coaxially about said axis of rotation and having axially extending protrusions which form said cam track, the rotatable mounting lug also being releasable for rotation relative to the housing following depression of the press stud, the press stud being provided on a member located interiorly of the knob and normally projecting through a slot or detent to prevent undesired rotation of said knob, said member having an annular surface with axially extending portions for engaging said protrusions, said axially extending portions being axially movable away from said protrusions following depression of said press stud;

a plurality of interchangeable child receiving means for mounting in and removal from the frame; and a support for the child receiving means when not in the frame.

10. A child support system as defined in claim 9, wherein:

the support comprises a bouncer frame having a dove-tail shape mounting lug for cooperation with a dove-tail shape recess in the mounting lug of the child receiving means.

11. A child support system as define in claim 9, wherein:

the child receiving means comprises a child's car seat which is adapted for mounting in and removal from vehicle for selective mounting in one of the frame and the bouncer frame as desired.

* * * * *